(12) United States Patent
Miller (10) Patent No.: US 8,770,902 B1
(45) Date of Patent: Jul. 8, 2014

(54) PRECISION LOCATING FASTENING SYSTEM

(75) Inventor: Richard V. Miller, Krum, TX (US)

(73) Assignee: Elijah Tooling, Inc., Krum, TX (US)

( * ) Notice: Subject to any disclaimer, the term of this patent is extended or adjusted under 35 U.S.C. 154(b) by 1212 days.

(21) Appl. No.: 12/540,318

(22) Filed: Aug. 12, 2009

Related U.S. Application Data (63) Continuation-in-part of application No. 11/473,274, filed on Jun. 22, 2006, now abandoned.

(60) Provisional application No. 60/698,596, filed on Jul. 12, 2005.

(51) Int. Cl.
*B23P 11/02* (2006.01)

(52) U.S. Cl.
USPC ............. 411/107; 29/507; 29/451; 29/525.02

(58) Field of Classification Search
USPC ................ 29/450, 451, 469, 507, 523, 522.1, 29/525.02, 525.05, 525.11, 525; 411/105, 411/107, 132, 339, 353, 354, 352, 999, 303
See application file for complete search history.

(56) References Cited

U.S. PATENT DOCUMENTS

| | | | |
|---|---|---|---|
| 1,256,706 A * | 2/1918 | Lewis ............................ | 411/105 |
| 1,842,724 A | 1/1932 | Langsner | |
| 2,376,089 A | 5/1945 | Savageau | |
| 2,639,179 A | 5/1953 | Phelps | |
| 2,919,736 A | 1/1960 | Kann | |
| 2,988,855 A | 6/1961 | Asfour et al. | |
| 2,992,685 A | 7/1961 | Madsen | |
| 3,124,190 A | 3/1964 | Cornell | |
| 3,250,559 A | 5/1966 | Sommerfield | |
| 3,255,799 A | 6/1966 | Heimovics | |
| 3,418,869 A * | 12/1968 | Herpich ......................... | 74/569 |
| 3,424,212 A | 1/1969 | Kemper | |
| 3,455,198 A * | 7/1969 | Barrett ......................... | 411/388 |
| 3,578,799 A | 5/1971 | Davis | |
| 3,683,988 A | 8/1972 | Carter et al. | |
| 4,139,315 A | 2/1979 | Levy et al. | |
| 4,396,327 A | 8/1983 | Menke | |
| 4,723,881 A | 2/1988 | Duran | |
| 4,735,536 A | 4/1988 | Duran | |
| 4,747,738 A | 5/1988 | Duran | |
| 4,815,908 A | 3/1989 | Duran et al. | |
| 4,846,622 A | 7/1989 | Lien | |
| 4,850,771 A * | 7/1989 | Hurd .............................. | 411/43 |
| 4,863,326 A * | 9/1989 | Vickers ......................... | 411/105 |
| 4,865,500 A | 9/1989 | Duran et al. | |
| 4,884,930 A | 12/1989 | Dobbeler | |
| 4,915,557 A | 4/1990 | Stafford | |
| 4,934,888 A | 6/1990 | Corsmeier et al. | |
| 4,963,063 A * | 10/1990 | Gulistan ....................... | 411/105 |
| 5,338,139 A | 8/1994 | Swanstrom | |

(Continued)

OTHER PUBLICATIONS

Boeing drawing "Back-Bolt Assembly," Dec. 13, 1993.

(Continued)

*Primary Examiner* — David Bryant
*Assistant Examiner* — Christopher M Koehler
(74) *Attorney, Agent, or Firm* — James E. Walton (57) ABSTRACT

A locator assembly and associated fastening assembly are described herein. The locator assembly may include a post locator and a receiver locator that combine to provide precision locating and attachment functions.

10 Claims, 11 Drawing Sheets

(56) References Cited

U.S. PATENT DOCUMENTS

| | | | |
|---|---|---|---|
| 5,462,395 A | 10/1995 | Damm et al. | |
| 5,611,654 A | 3/1997 | Frattarola et al. | |
| 6,022,009 A * | 2/2000 | Hill | 269/47 |
| 6,095,736 A | 8/2000 | Miller et al. | |
| 6,102,640 A | 8/2000 | Yokohama et al. | |
| 6,220,803 B1 | 4/2001 | Schellhase | |
| 6,296,431 B1 | 10/2001 | Miller | |
| 6,312,185 B1 | 11/2001 | Ernst | |
| 7,004,699 B2 | 2/2006 | Petrok et al. | |

OTHER PUBLICATIONS

Vought drawing, date unknown.
Vought Aircraft Company drawing, Jan. 4, 1994, maybe earlier.
Schunk—Workholding Solutions, Automation Components, Toolholding Components. Printed from www.schunk.com website, Aug. 6, 2009.
Jergens Catalog—Ball Lock Mounting System catalogue, last accessed on Aug. 12, 2009.

\* cited by examiner

*Fig. 29*
*Detail Z*

*Fig. 26*

PRECISION LOCATING FASTENING SYSTEM

CROSS-REFERENCE TO RELATED APPLICATIONS

This application is a continuation-in-part of prior application Ser. No. 11/473,274, filed 22 Jun. 2006, which claims the benefit of U.S. Provisional Application No. 60/698,596, filed 12 Jul. 2005, both of which are incorporated herein by reference in their entirety.

BACKGROUND

There are many designs of fastening systems well known in the art. However, considerable shortcomings remain.

BRIEF DESCRIPTION OF THE DRAWINGS

FIG. 18 is a side view of an inverted bolt fastener of the fastening system of FIG. 1.

DETAILED DESCRIPTION

Figure 1:
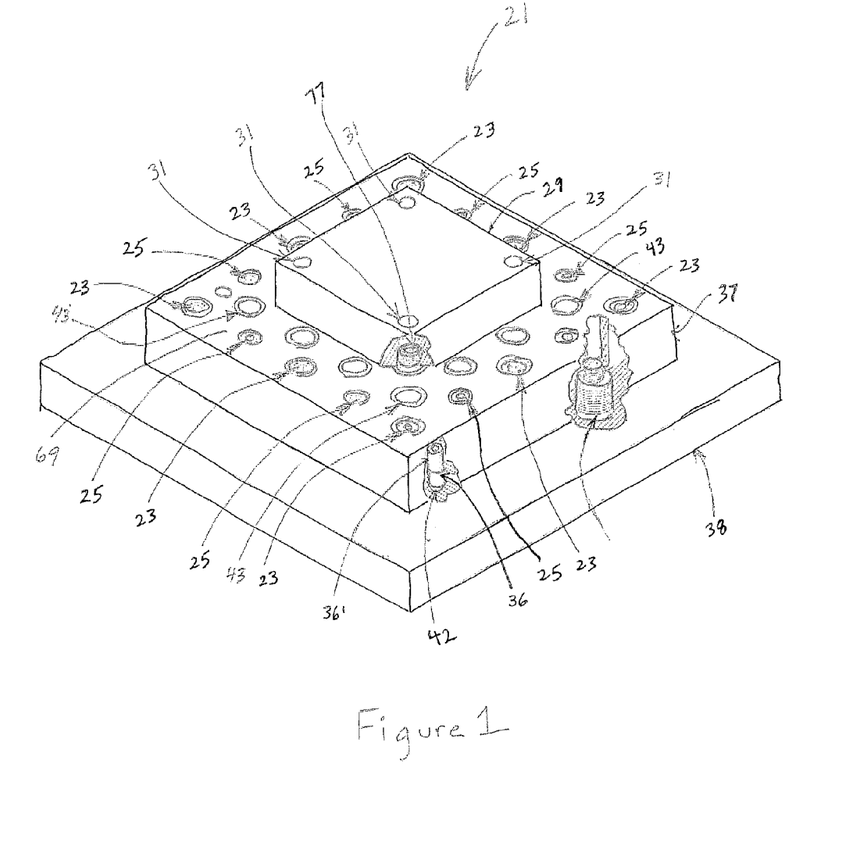
FIG. 1 is a tri-metric view, with portions cut away, of an example implementation of a fastening system according to the present disclosure.
Figure 7:
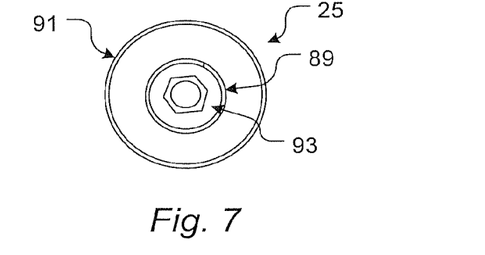
FIG. 7 is a top view of the non-locator stud of FIG. 3.
Figure 8:
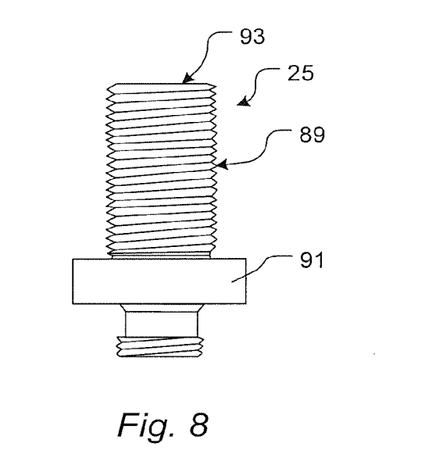
FIG. 8 is a side view of the non-locator stud of FIG. 3.

FIG. 1 shows an example fastening system. The fastening system 21 is well suited for both locating multiple objects with respect to each other in a highly accurate manner and for subsequently releasably fastening the objects to each other in the accurately located relative positions. As shown in FIG. 1, the fastening system 21 may include inverted locator studs 23 (see also FIGS. 2, 5 and 6), non-locator studs 25 (see also FIGS. 3, 7 and 8), and non-inverted locator studs 27 (see FIG. 4) for precisely locating and removably securing a first object to a second object and the second object to a third object, such as first object 29, second object 37, and third object 38, respectively. Each object is discussed in more detail below.

The first object 29 may include inverted locator stud passages 31 for receiving inverted locator studs 23. In other instances, the first object 29 may include non-locator stud passages 33 for receiving non-locator studs 25 or non-inverted locator stud passages 35 for receiving non-inverted locator studs 27. In still other instances, the first object 29 may include any combination of all or fewer than all types of passages 31, 33, 35. The first object 29 may be an unfinished part being secured for machining or a workpiece on which an operation is to be performed. In other instances, the first object 29 may include a vise or other tool being secured.

The second object 37 may include inverted locator stud cavities 39 (shown in FIG. 2) for receiving inverted locator studs 23, non-locator stud cavities 41 (shown in FIG. 3) for receiving non-locator studs 25, and non-inverted locator stud cavities 43 for receiving non-inverted locator studs 27. In other implementations, the second object 37 may include combinations of fewer than all types of cavities 39, 41, 43. In some instances, the second object 37 may be a modular fixture offering a variety of interface options intended to facilitate accurately aligning and securing the first object 29 to the second object 37.

Figure 16:
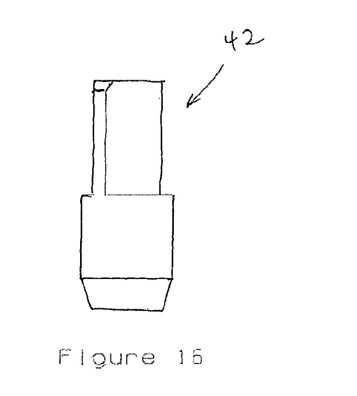
FIG. 16 is a side view of the diamond locating pin of the fastening system of FIG. 1.
Figure 17:
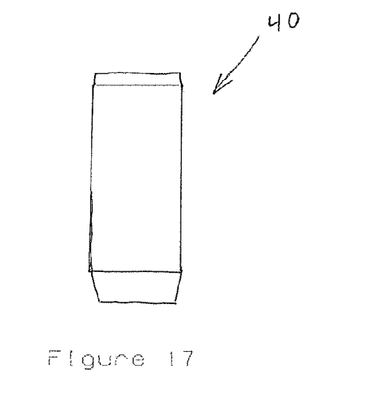
FIG. 17 is a side view of the round locating pin of the fastening system of FIG. 1.

An example third object 38, illustrated as a flat plate in FIG. 1, may be configured for connection to the second object 37 through the use of a combination of alignment/locating devices. In some implementations, the alignment/locating devices may include, but are not limited to, bushings 36 carried by the third object 38. An additional optional bushing 36' may be carried by the second object 37 and may be used to increase the accuracy of the alignment between the second object 37 and the third object 38. The bushings 36, 36' may be adapted to receive locator pins, such as locator pins 40 (shown, for example, in FIG. 17), diamond locator pins 42 (shown in FIG. 16, and inverted bolt fasteners 44 (shown in FIG. 18). The locator pins may be used to accurately align/locate the second object 37 relative to the third object 38. The locator pins may further be used to securely fasten the second object 37 and the third object 38 together. In some implementations, the third object 38 may be a sub-plate having a predetermined location relative to a machine tool (not shown) or may be located at a selected or known position relative to a machine tool.

In some instances, the bushings 36 and/or bushings 36' may be rigid bushings. For example, the bushings 36 and/or bushings 36' may be formed from a metal, such as steel (e.g., low carbon steels, stainless steels, high strength steels, etc.), aluminum or aluminum alloys, or any other type of metal. Alternatively, the bushings 36 may be formed from a polymer, glass, ceramic, or any other material that may be applicable or desired for a particular application. Further, the bushings 36 and/or 36' may be formed from a material having any desired rigidity.

As shown in FIG. 1, the combination of the first object 29, the second object 37, and the third object 38 may form a stacked arrangement that provides a highly accurate method of locating the first object 29 with respect to the machine tool or other device associated with the third object 38.

Figure 2:
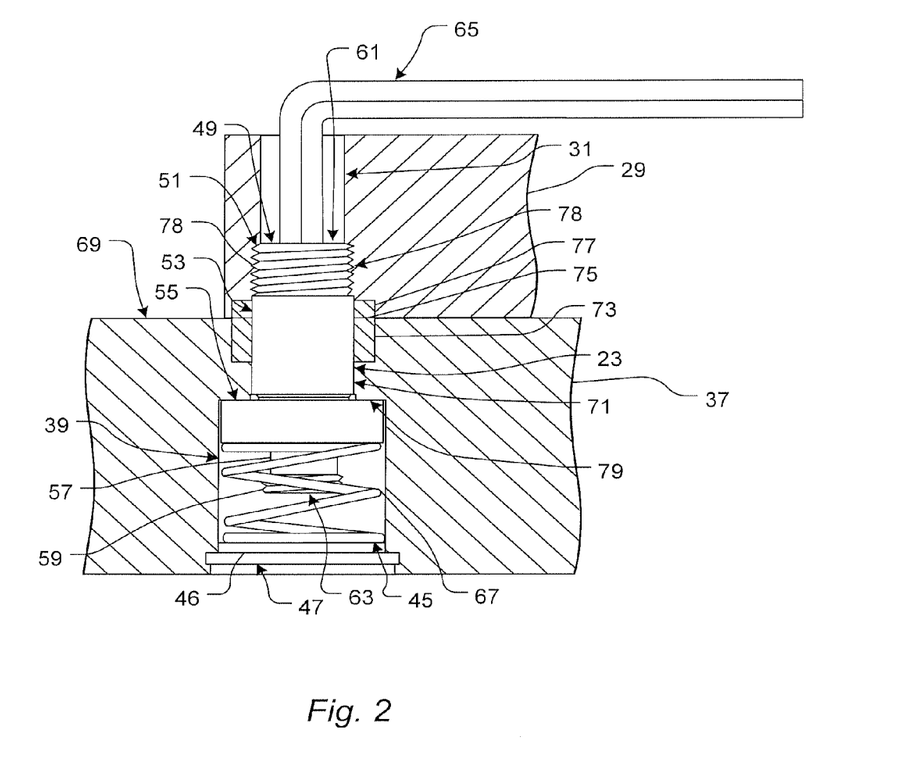
FIG. 2 is a cut-away view of an inverted locator stud of the fastening system of FIG. 1.

Referring now to FIG. 2, a portion of the fastening system 21 is illustrated with a cut-away view in which the first object 29, the second object 37, and the bushings 73 and bushings 77 (discussed below) are cut away to expose the inverted locator stud 23 and associated components. As shown in the example of FIG. 2, the second object 37 may form a generally flat plate having the inverted locator stud cavity 39. The cavity 39 may be configured to allow insertion of a cover 45 (see FIGS. 9 and 10), in which outer threads 46 of the cover 45 engage the second object 37 such as with mating threads. A retaining ring 47 may engage the second object 37, such as in an annular recess 48 formed in the second object 37, to prevent removal of the cover 45 from the cavity 39.

Figure 5:
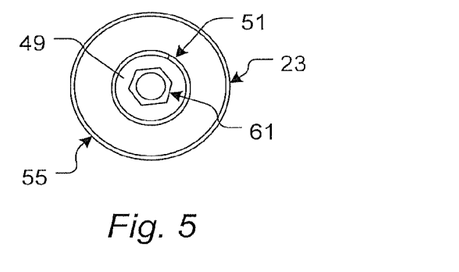
FIG. 5 is a top view of the inverted locator stud of FIG. 1.
Figure 6:
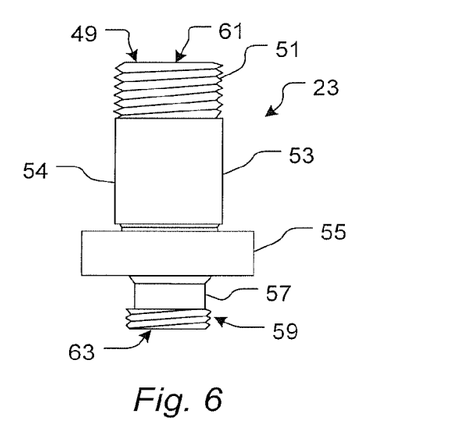
FIG. 6 is a side view of the inverted locator stud of FIG. 1.

FIGS. 5 and 6 show top and side views, respectively, of the stud 23. According to some implementations, the stud 23 may be a generally cylindrical member having a head 49 that includes a first set of threads 51 along an exterior surface of the head 49, a first neck portion 53, a stud flange 55, a second neck portion 57, a second set of threads 59, an upper adjustment bore 61, and an optional lower adjustment bore 63. The first neck portion 53 may include a high accuracy smooth portion 54 configured for precise engagement with bushing 73 and/or bushing 77 of complementary receiving diameter. According to some implementations, the upper and lower adjustment bores 61, 63 may be sized, shaped, and/or adapted to receive a wrench 65 (illustrated as a hex-head type wrench in FIG. 2) for rotating the stud 23 relative to the first object 29. The first set of threads 51 may be used to engage the first object 29, such as with threaded portion 78, such that the stud 23 is received into inverted locator stud passage 31 of first object 29. In some instances, the stud 23 may be constructed of steel. For example, the stud 23 may be formed from low carbon steel, stainless steel, high strength steel, or any other desired steel. In some instances, the stud 23 may be formed from 17-4PH stainless steel. In other implementations, of the inverted locator stud 23 may be formed from aluminum, bronze, copper, titanium, tin, or any other desired metal. Still further, the stud 23 may be formed from non-metallic materials, such as polymers, ceramics, glass, or any other material.

Again referring to FIG. 2, a spring 67 housed within the passage 31 acts against the cover 45 and the stud flange 55 to bias the stud 23 away from the cover 45, causing the head 49 and the first set of threads 51 to protrude above an outer face 69 of the second object 37. The smooth portion 54 of the first neck portion 53 extends through an aperture 71 (a portion of the cavity 39 which creates an opening to the outer face 69) and the primary bushing 73 (located coaxially with the aperture 71 and located with a top side 75 of the bushing 73 being located preferably 0.030" below outer face 69) which insures highly accurate/close-tolerance positioning of the first object 29 with respect to the second object 37. However, in other implementations, the top side 75 of the bushing 73 may be located flush or coplanar with the top side 75 of the bushing 73. The optional secondary bushing 77 may be carried by the first object 29 coaxially with the passage 31 to further improve the accuracy of the ability of system 21 to locate the first object 29 with respect to the second object 37. The wrench 65 may be operable to activate the stud 23 by advancing the first set of threads 51 into a threaded portion 78 of the passage 31. Once the stud flange 55 meets a shoulder 79 of the cavity 39, a holding force between the first object 29 and the second object 37 is created.

In some instances, the stud 23 is generally operable between two positions: a retracted position in which the stud 23 is entirely enclosed within the cavity 39 of the second object 37, and an extended position in which the stud 23 extends through the aperture 71 to engage the passage 31 of the first object 29. The stud 23 may be maintained in the retracted position by positive engagement between the second set of threads 59 and the internal threads 81 of the cover 45 (see FIGS. 9 and 10). According to some implementations, a user may move the stud 23 from the retracted position to the extended position by inserting the wrench 65 into either the upper adjustment bore 61 or the lower adjustment bore 63 and rotating the stud 23 until the second set of threads 59 disengage from the internal threads 81 of the cover 45. Where the lower adjustment bore 63 is to be utilized, the cavity 39 may provide access to lower adjustment bore 63.

Once the threads 59 disengage from the threads 81, the spring 67 (see FIGS. 11 and 12) forces the locating stud 23 upwards through the aperture 71 and into a properly aligned passage 31 until the first set of threads 51 engages the threaded portion 78 of the passage 31. Because the second set of threads 59 release from the internal threads 81 of the cover 45 prior to engagement of the first set of threads 51 with the threaded portion 78, the stud 23 does not undergo any unnecessary binding. As the stud 23 continues to rotate, the first set of threads 51 cause the stud 23 to advance into the first object 29 until the stud flange 55 seats against the shoulder 79. The first neck 53 is precisely produced, such as by being turned and/or otherwise machined, to pass through the bushings 73, 77 in a very precise manner. The first neck 53 in cooperation with the bushings 73, 77 provide positive location between the first object 29 and the second object 37.

The system 21 also provides another benefit. In some implementations, the second neck portion 57 may be formed with an outer diameter smaller than the outer diameter of the second set of threads 59. Consequently, when the threaded portion 59 extends past the mating threads 81, for example, to secure the stud 23 in a retracted position when not in use, the threads 81 pass over the outer surface of the second neck portion 57. As a result, the stud 23 will remain secured within the cavity 39 even as the second set of threads 59 pass through the threads 81. This benefit facilitates the use of high speed equipment, such as pneumatic, electric, and/or hydraulic tools, when securing the stud 23 into the retracted position within the cavity 39, such as when the stud 23 is not in use, without the risk of binding the stud 23 within the cavity 39.

Figure 3:
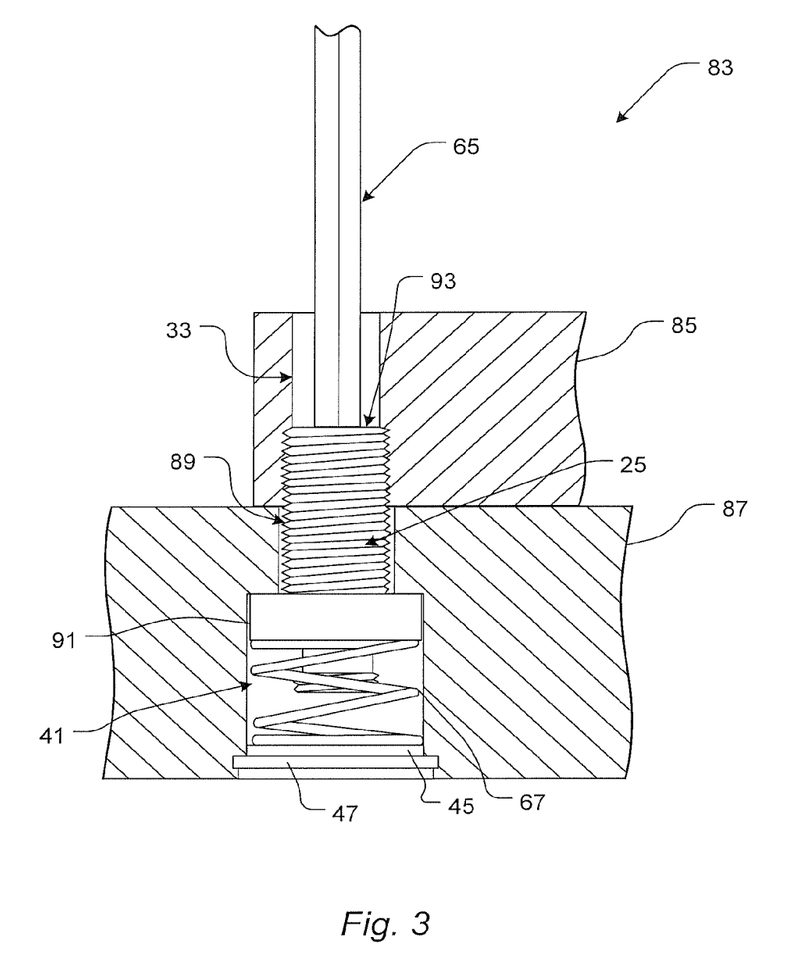
FIG. 3 is a cut-away view of a non-locator stud according to an alternate implementation of the fastening system.

FIG. 3 shows an alternative implementation of a fastening system 83. Particularly, FIG. 3 shows a cut-away view of the fastening system 83 in which a first object 85 and a second object 87 are cut away to expose a non-locator stud 25 and associated components. While the fastening system 83 may be substantially similar to fastening system 21, some differences may exist. For example, the stud 25 may be substantially similar to the stud 23, but, unlike the stud 23, a first neck portion 89 of the stud 25 (see FIGS. 7 and 8) is not smooth or accurately machined to match a bushing. Rather, the first neck portion 89 may be at least partially threaded from a stud flange 91 to a head 93. Also, while first and second objects 85, 87 may be substantially similar to the first and second objects 29, 37, respectively, according to some implementations, the first and second objects 85, 87 may not be configured to retain bushings. Additionally, operation of the fastening system 83 may differ from the operation of system 21. For example, in some implementations, the system 83 may not include bushings carried by one or more of the first object 85 or the second object 87. Consequently, the fastening system 83 may not provide the high accuracy locating functionality provided by the system 21.

Figure 4:
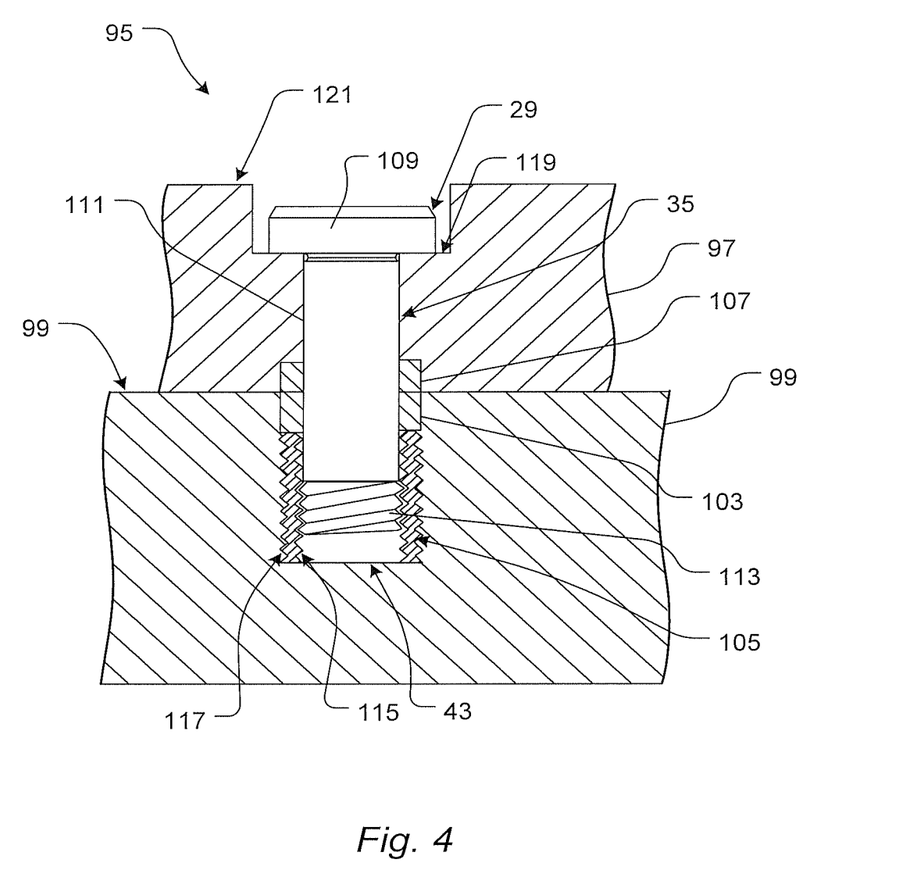
FIG. 4 is a cut-away view of a non-inverted locator stud of another alternate implementation of a fastening system.

FIG. 4 shows another example fastening system 95. Particularly, FIG. 4 illustrates a cut-away view in which a first object 97 and a second object 99 are cut away to expose a non-inverted locator stud 29 and associated components. The second object 99 may include a substantially cylindrically shaped non-inverted locator stud cavity 43. The cavity 43 may be open to an outer face 101 of the second object 99. An upper portion of the cavity 43 may be configured to receive a primary bushing 103 while a lower portion of the cavity 43 may be configured to receive a threaded insert 105. The first object 97 may include a non-inverted locator stud passage 35 for receiving the stud 29 therethrough. The stud passage 35 may be prepared with a close tolerance hole that matches the precise diameter of stud 29. The first object 97 is shown as being configured to receive an optional secondary bushing 107. The non-inverted locator stud 29 may include a flanged head 109 at a top end of the stud 29. The stud 29 may further include a smooth neck portion 111 and a lower threaded portion 113.

In operation, the lower threaded portion 113 is passed through the non-inverted locator stud passage 35, the bushings 103, 107 and to the threaded insert 105. The neck portion 111 extends through the primary bushing 103 and optional secondary bushing 107 to provide a highly accurate/close-tolerance positioning of the first object 97 with respect to the second object 99. Next, a wrench (not shown) may be used to advance the stud 29 by rotating the lower threaded portion 113 into a set of internal threads 115 of the threaded insert 105. A set of external threads 117 which engage a threaded wall of cavity 43 may be configured to prevent unintentional removal of the threaded insert 105. Further, an adhesive, glue, or securing agent or element may optionally be applied to the external threads 117 to secure the threaded insert 105 in the cavity 43. When the flanged head 109 meets a shoulder portion 119 of the passage 35 (or optionally an outer face 121 of the first object 97), a holding force between the first object 97 and the second object 99 is created.

Figure 9:
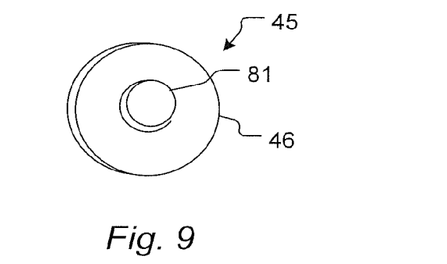
FIG. 9 is a top view of a cover of the fastening system of FIG. 1.
Figure 10:
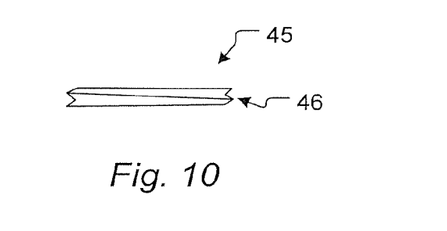
FIG. 10 is a side view of the cover of the fastening system of FIG. 1.

In the example implementations shown in FIGS. 9 and 10, the cover 45 is a washer-shaped member having the internal threads 81 and optional the external threads 46. The cover 45 allows the studs 23, 25 to be driven from below the outer face 69, so that when the studs 23, 25 are not in use, the studs 23, 25 can be retained in the retracted position within the second objects 37, 87, respectively. The external threads 46 facilitate retention of the cover 45 within the second objects 37, 87, but are optional. Where the cover 45 does not incorporate the external threads 46, the cover 45 may be retained by any other suitable method by which the cover 45 is restricted from rotating. The cover 45 may also provide a bearing surface against which the spring 67 bears to bias the studs 23, 25 against the stud flanges 55, 91, respectively. The retaining ring 47 prevents the cover 45 from exiting the second objects 37, 87 during use of the systems 21, 83, respectively.

Figure 11:
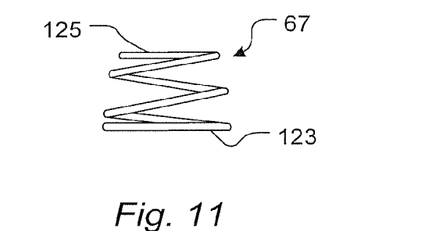
FIG. 11 is a side view of a spring of the fastening system of FIG. 1.
Figure 12:
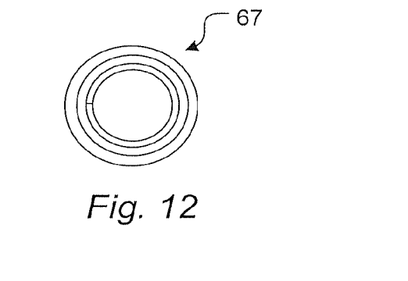
FIG. 12 is a top view of the spring of the fastening system of FIG. 1.

FIGS. 11 and 12 show an example implementation of the spring 67. As shown, the spring 67 is preferably a helical-type coil spring having a base 123 and a top 125. The spring 67 forces the studs 23, 25 from the retracted position into the extended position and into first objects 29, 85, respectively, upon the disengagement of the second set of threads 59 from the internal threads 81. The base 123 preferably acts against cover 45 while the top 125 preferably acts against the stud flanges 55, 91. The spring is not so limited, however. Thus, in some implementations, the spring 67 may have other desired shapes. For example, the spring 67 may be cylindrical or may be taped at opposing ends. That is, the design, e.g., shape, of the spring 67 may be defined according to a particular application.

Figure 13:
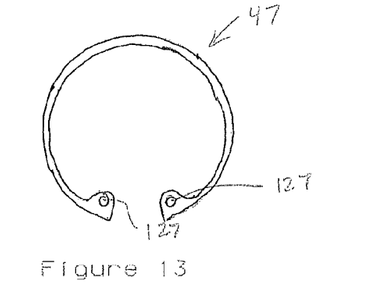
FIG. 13 is a top view of a retaining ring of the fastening system of FIG. 1.

FIG. 13 shows an example retaining ring 13. As show, the retaining ring 13 is preferably a C-type retaining ring having retaining ring holes 127 sized, shaped, and adapted for receiving a typical retaining ring tool (not shown). The retaining ring 13 may be adapted to retain the cover 45 within second objects 37, 87. In implementations in which the cover 45 includes the optional external threads 46, the retaining ring 13 prevents the cover 45 from unscrewing or otherwise backing out of or releasing from the second objects 37, 87 and from disengaging from the second objects 37, 87. It will be appreciated that in alternative implementations, the retaining ring 13 may be of a type other than a C-type retaining ring.

Figure 14:
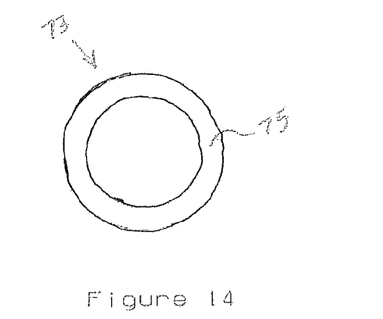
FIG. 14 is a top view of a bushing of the fastening system of FIG. 1.
Figure 15:
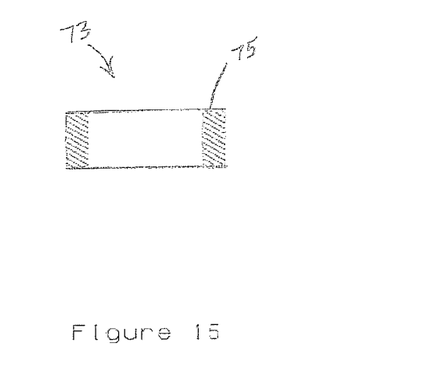
FIG. 15 is a side view of the bushing of the fastening system of FIG. 1.

FIGS. 14 and 15 show an example implementation of the primary bushing 73. According to some implementations, the primary bushing 73 may be an accurately formed (such as by precision machining) standard type bushing. However, according to other implementations, the example fastening systems may incorporate other types of bushings. Specifically, bushings having wipers may be used instead of standard type bushings.

Figure 19:
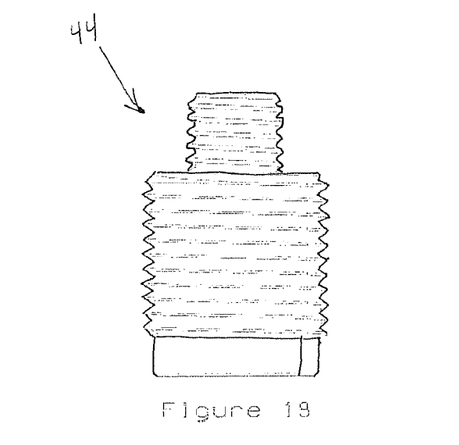
FIG. 19 shows a cross-sectional view of another implementation of a precision locating device.
Figure 20:
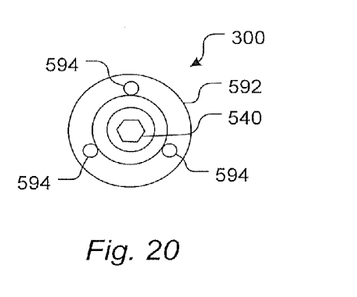
FIG. 20 shows a top view of the precision locating device of FIG. 19.

FIGS. 19 and 20 show another implementation of a precision locating device 300. The device 300 includes a housing 310, a bushing 320, a locator stud 330, a spring 340, an end cover 350, and a retainer 380. The housing 310 includes a threaded outer surface 360. The housing 310 includes a first opening 370 and a second opening 380 opposite each other. The first opening 370 defines a first cavity 390 that houses the bushing 320. An end surface 400 of the bushing 320 abuts an internal flange 410 of the housing 310. In some implementations, the bushing 320 includes a precisely formed internal opening 420 to precisely align and/or locate the locator stud 330.

The housing 310 defines a second cavity 430 that communicates with the second opening 380 when the end cover 350 is not attached. The spring 340 is disposed in the second cavity 430 and compressed between a flange 440 of the locator stud 330 and a surface 450 of the end cover 350. The spring 340 biases the locator stud 330 towards the first opening 370 so that the locator stud 330 is in an extended position. As shown, the spring 340 is a coil-type spring having a conical shape. This allows the spring 340 to collapse in an essentially flat manner, i.e., as the spring 340 is collapsed, the spring 340 forms a flattened coil. However, in other implementations, the spring 340 may be other types of springs. For example, the spring 340 may be cylindrical, be of a dual tapered type, or may be of any desired shape.

The locator stud 330 includes a first shank portion 460, a threaded portion 470 at an end of the first shank portion 460, the flange 440, a second shank portion 490, and a second threaded portion 500 at an end of the second shank portion 490. The first shank portion 460 is precisely retained within the internal opening 420 so that the first shank portion 460 and the internal opening 420 cooperate to precisely locate a first object to which the housing is attached relative to a second object to which the locator stud is attached. The locator stud 330 is also shown has having first bore 540 and second bore 550 that may be adapted to accept a tool for rotating the locator stud 330 relative to housing 310 so that the locator stud 330 may be secured into an object, such as in a threaded relationship. FIGS. 19 and 20 illustrate the bores as being adapted to accept a hex-head tool. However, the scope of the locating device 300 is not so limited, and, as such, the first and second bores 540, 550 may be adapted to accept any other shaped tool, such as a Torx™ tool produced by Acument® Global Technologies North America, 6125 Eighteen Mile Road, Sterling Heights, Mich. The locator stud 330 may also include a groove 335 to retain a seal 337. The groove 335 may be formed in an outer surface of the first shank portion 460. The seal 337 may be operable to prevent fluids or debris from entering the locating device 300. Further, the seal 337 may be an O-ring formed from a polymer (e.g., rubber) or any other suitable material. However, the seal 337 may be any other suitable device or structure.

The spring 340 biases the locator stud 330 within the housing 310 towards the first opening 370. The spring 340 is operable to displace the locator stud 330 until the flange 440 of the locator stud 330 contacts the internal flange 410 of the housing 310. In this position, the locator stud 330 is in the extended position. The locator stud 330 may be placed into a retracted position by applying a force against the spring 340 and threading the second threaded portion 500 into internal mating threads 510 formed on an interior passage surface of the end cover 350. The second shank portion 490 has a smaller diameter than the outer diameter of the second threaded portion 500. Therefore, as explained above, the threaded engagement of the locator stud 330 and the end cover 350 allow for the use of high-speed tools because the locator stud 330 will freely spin after the second threaded portion 500 has threaded past the internal mating threads 510 of the end cover 350. Also, the end cover 310 includes an outer threaded surface 520 that engages an internal threaded surface 530 of the housing 310. The threaded surface 520 engages the threaded surface 530 to retain the end cover 310. However, the end cover 310 may be retained in the housing 310 in other ways and is not so limited to being retained by a threaded connection. For example, as explained below with reference to FIGS. 21 and 22, an end cover may be retained by an interference fit. For example, the end cover may be press fitted to an interior or exterior surface of the housing. Alternately, the end cover may be retained by a set screw, keyed connection, or any other suitable manner.

Similar to the retaining ring 13, described above, the retainer 380 is adapted to retain the end cover 350 in the housing 310. According to some implementations, the retainer 380 may be a C-type retaining ring, a circlip, press-fit washer, or any other suitable retainer.

FIG. 20 is a top view of the locating device 300 showing an end surface 592 of the housing 310. The end surface 600 includes a plurality of bores 594. Although only three bores 594 are shown, the end surface 600 may include more or fewer bores 594. The bores 594 may be adapted accept a single or multi-prong tool for rotating the locating device 300 so that the locating device 300 may be inserted into an object, similar to the second object 37 shown in FIG. 2. In such a case, the threaded outer surface 360 engage a mating threaded surface provided in the object. Thus, installed in a second object, the locating device 300 may perform in a manner similar to the fastening system shown in FIG. 2. That is, the locating device 300 may be operable to accurately position and hold a first object relative to a second object in a fast and efficient manner.

While the example locating device 300 is shown having the bushing 320 and the locator stud 330 having the precision first shank portion 460, other implementations may not include these features. For example, in some instances, fastening devices that do not require the precision locating function may not include one or more of these features.

Figure 21:
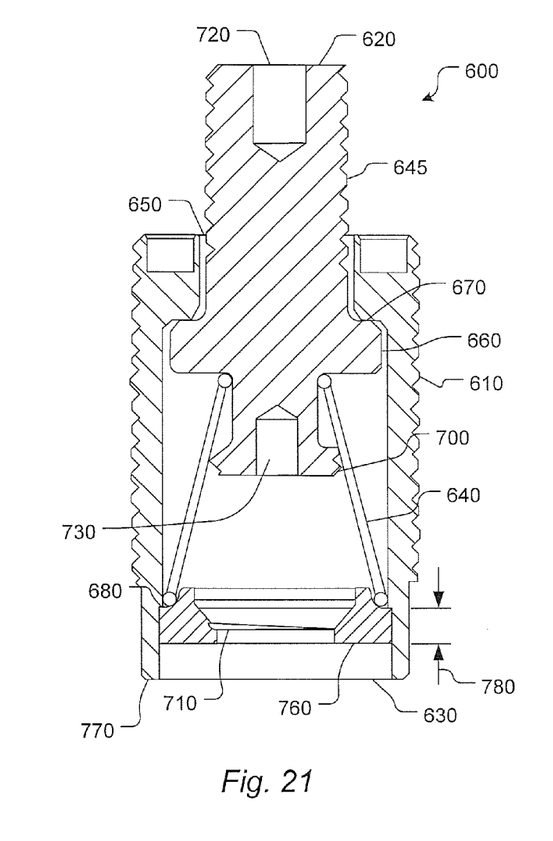
FIG. 21 shows a cross-sectional view of a further implementation of a fastening device.
Figure 22:
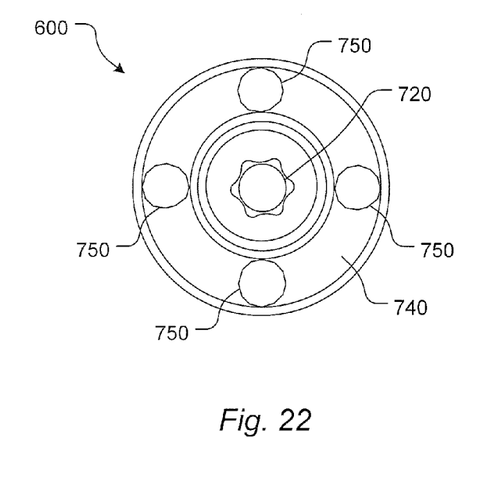
FIG. 22 shows a top view of the fastening device of FIG. 21.

FIGS. 21 and 22 show a cross-sectional view and a top view, respectively, of an alternate example fastening device 600. The fastening device 600 may include a housing 610, a locator stud 620, an end cover 630, and a spring 640 disposed between the locator stud 620 and the end cover 630. The spring 640 may bias the locator stud 620 into an extended position in which a threaded surface 645 extends through a first opening 650 of the housing 610. As shown, the spring 640 is a tapered spring. However, as explained above, the type of spring is not so limited and may be any desired shape or type. The spring 640 may displace the locator stud 620 within the housing 610 until a flange 660 of the locator stud 620 contacts a flange 670 of the housing 610.

The housing 610 includes an outer threaded surface 660 that is adapted to engage a mating threaded surface in an object (e.g., a second object similar to the second object 37), similar to the locating device 300, described above. The threaded surface 645 may be adapted to securely attach a first object (similar to the first objects 29 and 85) relative to a second object (similar to the second objects 37 and 87). The housing 610 may also include a lip 680 adapted to engage an adjacent surface 690 of the end cover 630. In some instances, the end cover 630 may be secured to the housing 610 by an interference fit. In the example shown, the combination of attached end cover 630 and housing 610 form a groove into which an end of the spring 640 resides.

Figure 23:
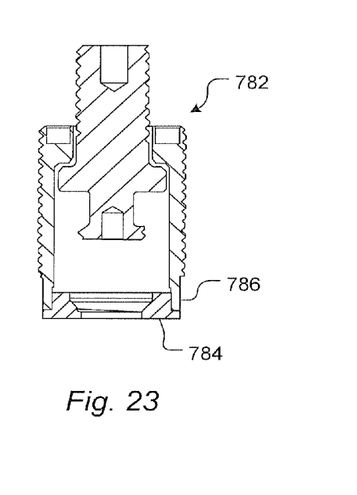
FIG. 23 shows another example fastening device having an alternate end cover construction.

Although FIG. 21 shows the end cover 630 being fitted to an internal surface of the housing 610, the scope is not so limited. Rather, the end cover 630 may be fitted to an external surface, such as by an interference fit. Referring again to FIG. 20, when fitted, a lower surface 760 of the end cover 630 is located interior relative to an outer surface 770 of the housing 610, as indicated by gap 780. Consequently, in some implementations, the length of the housing 610 may be used as a precision length. FIG. 23 shows a further example fastening device 782 having an alternate end cover 784 design. Similar to the fastening device 600, the end cover 784 may be pressed into housing 786 and have an interference fit therewith.

In a manner similar to that described above, the locator stud 620 may be secured in a retracted position by engagement of a threaded surfaced 700 to mating threads 710 formed on an inner surface of the end cover 630. The locator stud 620 may be placed in the extended or retracted position by using one or more of the bores 720, 730 formed in opposing ends of the locator stud 620. As described above, the bores may be adapted to accept a tool. For example, the bores may be adapted to accept a hex-head tool, a Torx™ tool, or any other tool.

Further, referring to FIG. 22, an exterior surface 740 of the housing 610 may include one or more bores 750 formed therein. As explained above, the bores 750 may be adapted to accept a single or multi-prong tool for securing the locating device 600 into an object, such as the second objects 37 and 87, discussed above.

Figure 24:
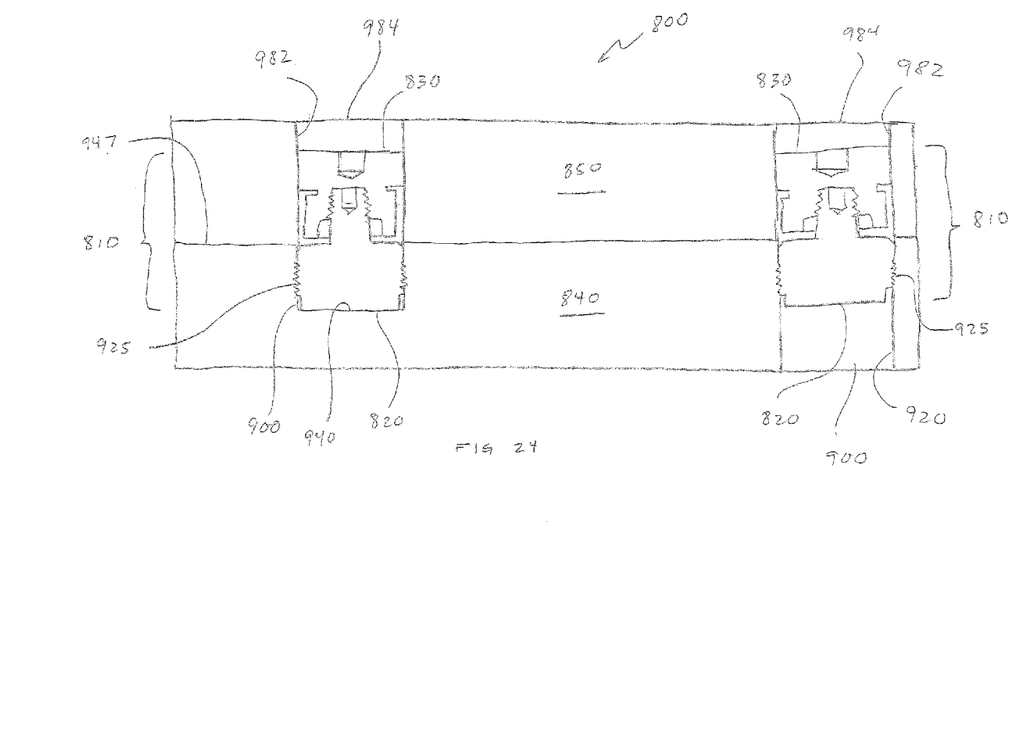
FIG. 24 shows a further example fastening system including a plurality of locator assemblies having a post locator and a receiver locator.
Figure 29:
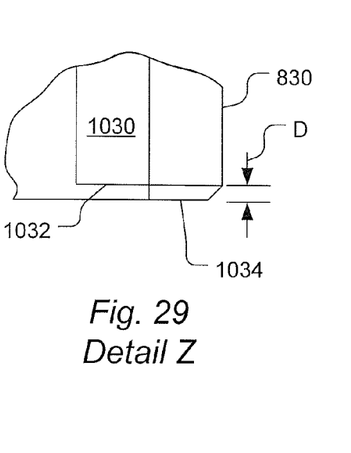
FIG. 29 is a detail view of a portion of an example receiver locator.
Figure 30:
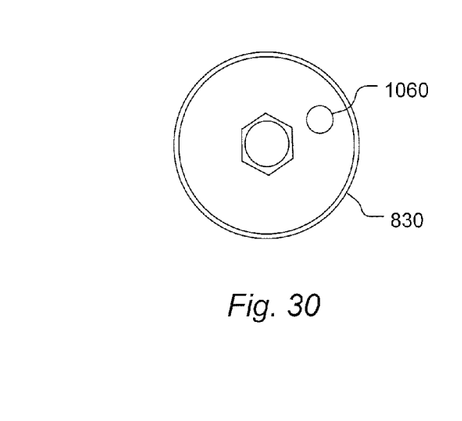
FIG. 30 is a top view of an example receiver locator.
Figure 31:
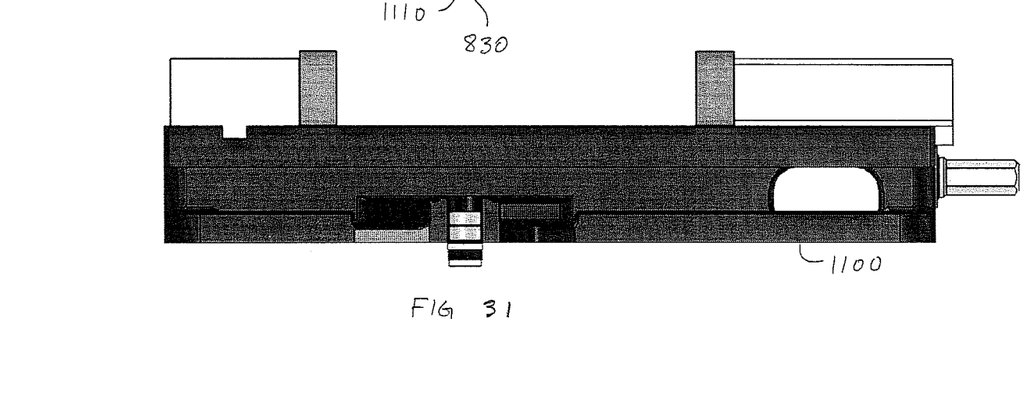
FIGS. 31 and 32 show a side view and top view, respectively, of an example vice that may be included in an example fastening system described herein.
Figure 32:
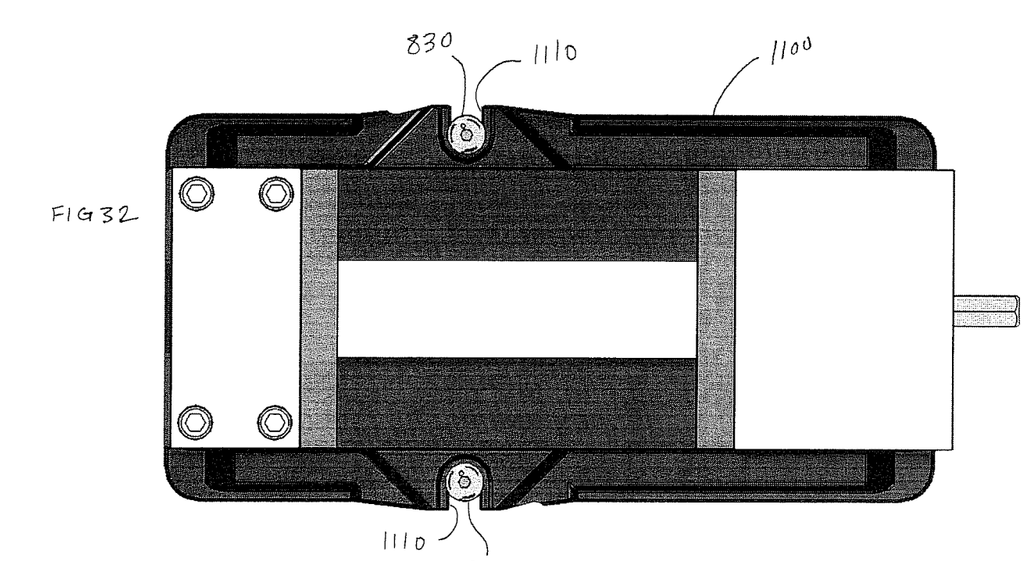

FIGS. 24-32 illustrate other example fastening and precision locating systems and/or portions thereof. Referring to FIG. 24, an example fastening system 800 is illustrated including locator assemblies 810. The locator assemblies 810 may include post locators 820 and associated receiver locators 830. The receiver locators 830 are disposed in a first object 840, and the post locators 820 are disposed in a second object 850. The locator assemblies 810 are operable to secure the first object 840 and second object 850 to each other while also precisely locating the first object 840 and second object 850 relative to each other. The locator assemblies 810 also facilitate rapid removal and reassembly of the second object from and to the first object while maintaining a precise location of the second object 850 relative to the first object 840 upon reassembly. Thus, the locator assemblies 810 can facilitate mass production operations on workpieces without the need to relocate the workpiece relative to a datum location. Thus, production of the workpieces is increase, thereby reducing production costs. In some instances, the first object 840 may be a base or sub-plate. In some instances, the second object 850 may be a workpiece or a quick-change plate onto which a workpiece is attached. In other instances, the second object 850 may be a tool, such as a vice. An example vice 1100 is shown in FIGS. 31 and 32. The vice 1100 may include slots 1110 into which receiver locators 830 are received.

Figure 25:
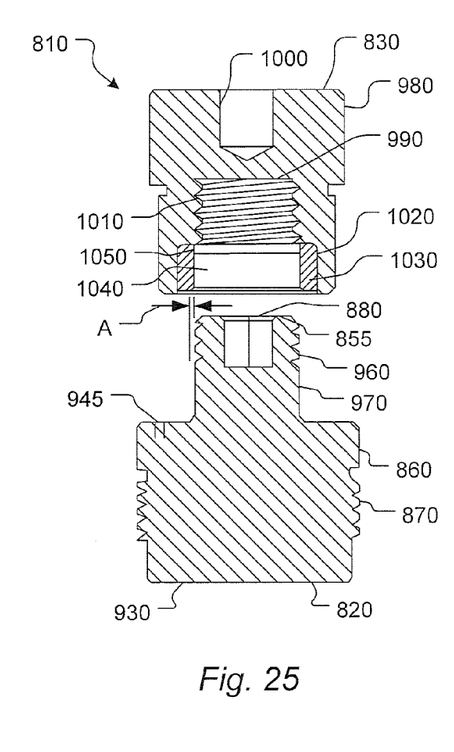
FIG. 25 is a cross-sectional view of a fastening device.
Figure 26:
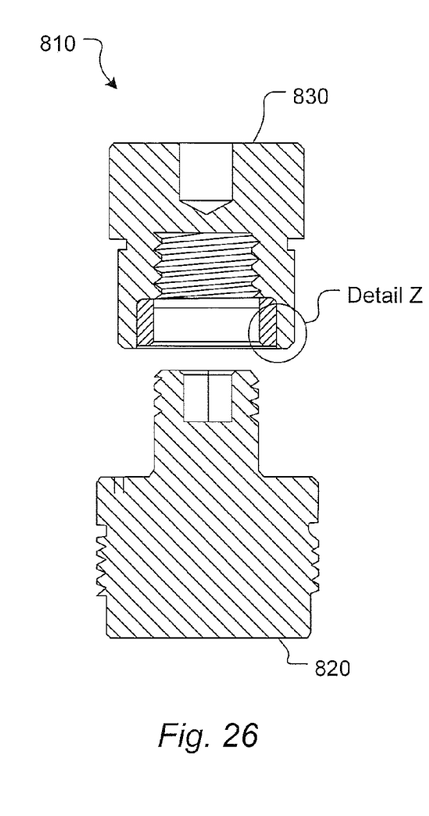
FIG. 26 is an alternate implementation of the locator assembly.

FIGS. 25 and 26 illustrate cross-sectional views of example fastening and locator assemblies 810 in which the post locators 820 and the receiver locators 830 are in attached and detached configuration, respectively. Referring to FIGS. 24 and 25, the post locator 820 may include a post 855, a locating portion 860, a threaded portion 870, and a bore 880. The post 855 may include a precision surface 890. For the example shown, the post locator 820 is threadably retained in the first object 840 by the engagement of the threaded portion 870 and mating threads 925 formed on an interior surface 920 of bore 900. The bore 880 may be adapted to accept a tool in a manner similar to that described above. As the post locator 820 is secured into the first object, the locating portion 860 engages the interior surface 920 of the bore 900. In some instances, the interior surface 920 and locating portion 860 have an interference fit. For example, where the bore 900 is a through-hole (such as illustrated on the right-hand side of FIG. 24), the post locator 820 may have an interference fit within the bore 900. On the other hand, the bore 900 may terminate within the first object 840, as illustrated on the left-hand side of FIG. 24. As such, the post locator 820 may be secured within the bore 900 when a first surface 930 of the post locator 820 engages adjacent surface 940 of the bore 900. In such instances, the locating portion 860 may not interfere with the inner surface 920, although, in other implementations, these portions may still have an interference fit.

In some instances, a surface 945 of the post locator 820 may align with surface 947 of the first object 840. In other instances, the surface 945 may be disposed above or below the surface 947.

In some implementations, the post 855 may be tapered. For example, in some instances, the post 855 may have a taper angle A of 1.5°. In other instances, the taper angle A may be between 0 and 5°. In still other instances, the taper angle A may be larger than 5°. In some implementations, the post 855 may include a threaded portion 960 and a precision surface 970. The precision surface 970 may have an average roughness, Ra, of eight. In other instances, the average roughness may be larger or smaller than eight. Further, the average roughness may be any desired roughness. For example, the average roughness may be selected based on the application to which the locator assemblies 810 may be used. For example, in applications requiring greater precision than those afforded by an average roughness of eight, the average roughness may be selected to be lower than eight. In other instances requiring less precision, an average roughness greater than eight may be selected. In some instances, the average roughness may be obtained via a grinding or polishing process, although any suitable method may be employed. In other implementations, the precision surface 970 may be omitted and the external surface of post 855 may be entirely or substantially entirely threaded (see, for example, FIG. 26, discussed in more detail below).

The receiver locator 830 may include a locating portion 980, first bore 990, and a second bore 1000. The first bore 990 may include a threaded portion 1010 and an enlarged portion 1020 in which a bushing 1030 is disposed. The bushing 1030 may be a rigid material. For example, the bushing 1030 may be a metal, such as steel, aluminum, titanium, or any other desired metal. In other instances, the bushing 1030 may be formed from a polymer, ceramic, glass, or any other material. In some instances, the bushing 1030 may be a stainless steel, such as 17-4PH stainless steel.

The post locator 820 and the receiver locator 830 may be formed from the same or different material than the bushing 1030. For example, the post locator 820 and receiver locator 830 may be formed from a metal, such as steel, aluminum, titanium, or any other metal. For example, the post locator 820 and the receiver locator 830 may be formed from 17-4PH stainless steel. Further, the bushing 1030, post locator 820, and receiver locator 830 may have any desired hardness. For example, the bushing 1030, post locator 820, and the receiver locator 830 may have the same hardness. For example, one or more of the bushing 1030, post locator 820, and receiver locator 830 may have a Rockwell hardness of 42. However, in other instances, one or more of theses may have a Rockwell hardness greater or less than 42. For example, in some cases, one or more of these may have a Rockwell hardness anywhere between 40 and 60, although, in other instances, the hardness may be higher or lower. The hardness desired and the material used may be dependent upon the application and may be different from those expressly described.

Figure 27:
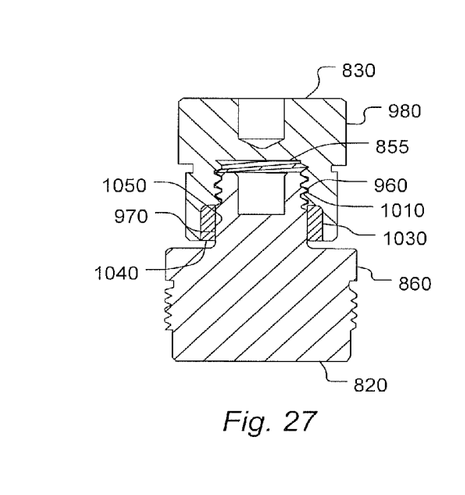
FIG. 27 is a cross-sectional view of an example locator assembly in which the post locator and the receiver locator are coupled.

The bushing 1030 includes an interior passageway 1040 forming an interior surface 1050. The interior passageway 1040 includes a precisionly formed diameter. As shown in FIG. 27, the threaded portion 960 of the post locator 820 engages the threaded portion 1010 of the receiver locator 830. As the receiver locator 830 is threaded onto the post 855 of the post locator 820, the locating portion 980 of the receiver locator 830 engages an interior surface 982 of bore 984 of the second object 850 (see, for example, FIG. 24). Thus, in some implementations, the interior surface 982 and the locating portion 980 have an interference fit. Further, the precision surface 970 of the post locator 820 engages the internal surface 1050 of the receiver locator 830 to provide for precision locating of the post locator 820 relative to the receiver locator 830 and, by extension, the precision locating of the first object 840 relative to the second object 850. Accordingly, the post locator 820 and receiver locator 830 cooperate to precisely align and secure the first object 840 and second object 850 relative to each other.

Figure 28A:
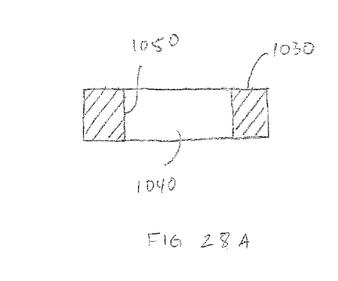
FIGS. 28A-28C show example implementations of bushings.
Figure 28B:
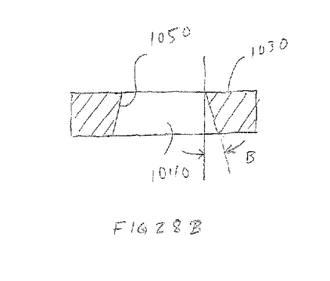
Figure 28C:
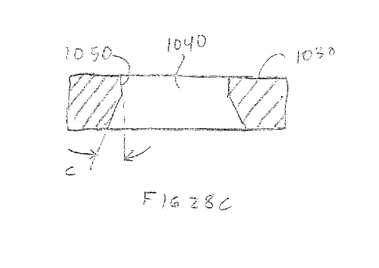

The interior surface 1050 of the bushing 1030 may have different profiles. For example, FIG. 28A-28C show different bushing designs that may be used. For example, FIG. 28A shows a bushing 1030 with a cylindrical interior opening 1040. FIG. 28B shows the interior opening 1040 having a taper of angle B. Further, FIG. 28C shows the interior opening 1040 having a partial taper of angle C. In some instances taper angles B and C may correspond to the taper angle A of the post 855. In other instances the taper angles B and C may be different than the taper angle A. For example, in some instances, the taper angles B and C may be greater than taper angle A, while in others, the taper angles B and C may be less than the taper angle A.

Referring to FIG. 29 is a detailed view of a portion of the receiver locator 830. According to some implementations, an end surface 1032 of the bushing 1030 is internal to the receiver locator 830 relative to an end surface 1034 thereof, as indicated by distance D. In other implementations, the end surfaces 1032 and 1034 may be aligned. In still others, the end surface 1032 may extend beyond end surface 1034. Further, while implementations are described in which the receiver locator 830 includes a busing 1030, in other implementations, the bushing may be omitted. Further, in such implementations, an interior surface of the first bore 990 may be adapted to be the precision surface that contacts the precision surface 970 for precise alignment.

The fastening system 800 can provide precision alignment of the first object 840 and the second object 850. For example, in some instances, the precision alignment between the first object 840 and the second object 850 may be ±0.0005 inches. In other instances the alignment precision may be greater or less than of ±0.0005 inches. For example, the precision alignment may be ±0.0008 inches, while in other instances the precision alignment may be ±0.0003 inches, although other precision levels may be achieved. The precision alignment afforded by the fastening system 800 allows detachment of the second object 850 relative to the first object 840 and reattachment without the need to relocate the second object 850 relative to the first object 840. Thus, if a workpiece is secured to the second object 850, the fastening system 800 avoids the need to relocate the workpiece relative to the first object 840 or some other datum.

The receiver locator 850 may be attached to the post locator 820 by, for example, insertion of a tool into bore 1000 and threading the receiver locator 830 onto the post locator 820. The bore 1000 may be adapted to receive a variety of tools, such as one of the examples described above or any other tool.

The receiver post 830 may also include an additional bore 1060, as shown in FIG. 30. The bore 1060 may be utilized for removing the receiver post 830 from the second object 850. This may be useful when opening of the second object 850 in which the receiver post 830 is located is deep or when the receiver post 830 may otherwise be difficult to remove from the second object 850. In some instances, the bore 1060 may be threaded to cooperate with a tool with mating threads to facilitate removal of the receiver post 830.

While FIG. 25 shows a locator assembly 800 having a post locator 820 with precision surface 860, in other instances, the post locator 820 may not include the precision surface 860. For example, FIG. 26 shows a locator assembly 800 in which the post 855 does not include a precision surface. Rather, threads may be formed on all or substantially all of the external surface of the post 855. Such a post locator 820 may be used where less precision location is required. Further, as also shown in FIG. 26, the receiver locator 830 may include precision bushing 1030. In other instances, a receiver locator 830 without a precision bushing 1030 may be used in combination with the post locator 820. Still further, a receiver locator 830 without a precision bushing 1030 may be used in combination with a post locator 820 having the precision surface 860. Consequently, the described fastening systems provide flexibility and interchangeability. Further, in some implementations, an anti-seize compound may be used on the precision surface 860 to prevent or reduce binding between the post locator 820 and the receiver locator 830.

The present disclosure describes fastening systems that may include studs 23, 25, 27; pins 40, 42; inverted bolt fasteners 18; one or more types of the locator assemblies (such as locator assemblies 810 described above); or combinations thereof to provide significant benefits of providing positive location and holding functionality simultaneously. Further, one or more of the fastening systems described herein allows for quick removal of a first object from a second object and, similarly, quick removal of a second object from a third object. The described fastening systems also provide non-intrusive connections between first, second, and third objects while providing commonality with existing locating stud systems.

Although the present disclosure has been described with several implementations, various changes and modifications may be suggested to one skilled in the art. It is intended that the present disclosure encompass such changes and modifications as fall within the scope of the appended claims and their equivalence.

What is claimed is:

1. A fastener, comprising:
    a retractable stud adapted to be received into a first object, the retractable stud comprising:
        a first attachment portion adapted to engage a first interior surface formed in the first object; and
        a tapered post comprising a second attachment portion and a first locating portion; and
    a body adapted to be received into a second object, the retractable stud being releasably coupled to and axially biased within the body by a spring, the spring disposed within the body, the body comprising:
        a first engaging portion adapted to engage a second interior surface formed in the body with an interference fit;
        a bore adapted to receive the tapered post, the bore comprising:
            a third attachment portion adapted to cooperatively engage the second attachment portion; and
            a second locating portion adapted to engage the first locating portion of the tapered post to align the retractable stud relative to the body.

2. The fastener of claim 1, wherein the retractable stud further comprises a second engaging portion adapted to engage an interior surface of the second object with an interference fit.

3. The fastener of claim 1, wherein the body further comprises a bushing, and wherein an interior surface of the bushing comprises the second locating portion.

4. The fastener of claim 3, wherein the bushing is a rigid bushing.

5. The fastener of claim 3 wherein the interior surface of the bushing is cylindrical.

6. The fastener of claim 3, wherein the interior surface of the busing is at least partially tapered.

7. The fastener of claim 6, wherein a taper angle of the first locating portion of the tapered post corresponds to a taper angle of the interior surface of the bushing.

8. The fastener of claim 1, wherein the first locating portion comprises a precisionly formed surface.

9. The fastener of claim 8, wherein the precisionly formed surface of the locating portion has an average roughness, Ra, of eight.

10. The fastener of claim 1, wherein the body is integrally formed within the second object.

* * * * *